US011887393B2

(12) United States Patent
Periyakaruppan et al.

(10) Patent No.: US 11,887,393 B2
(45) Date of Patent: Jan. 30, 2024

(54) END-TO-END SYSTEM FOR EXTRACTING TABULAR DATA PRESENT IN ELECTRONIC DOCUMENTS AND METHOD THEREOF

(71) Applicant: CLARITRICS INC., New York, NY (US)

(72) Inventors: Nandhinee Periyakaruppan, Chennai (IN); Harinath Krishnamoorthy, Chennai (IN); Anil Goyal, Haryana (IN); Sudarsun Santhiappan, Chennai (IN)

(73) Assignee: CLARITRICS INC., New York, NY (US)

( * ) Notice: Subject to any disclaimer, the term of this patent is extended or adjusted under 35 U.S.C. 154(b) by 38 days.

(21) Appl. No.: 17/683,954

(22) Filed: Mar. 1, 2022

(65) Prior Publication Data

US 2022/0284722 A1 Sep. 8, 2022

Related U.S. Application Data

(60) Provisional application No. 63/200,356, filed on Mar. 2, 2021.

(51) Int. Cl.
*G06V 30/412* (2022.01)
*G06V 30/414* (2022.01)
(Continued)

(52) U.S. Cl.
CPC ............ *G06V 30/412* (2022.01); *G06V 30/18* (2022.01); *G06V 30/184* (2022.01);
(Continued)

(58) Field of Classification Search
CPC ............................................... G06V 30/00–43
See application file for complete search history.

(56) References Cited

U.S. PATENT DOCUMENTS 6,711,292 B2 * 3/2004 Wang .................. G06V 30/412 382/199
9,495,347 B2 11/2016 Stadermann et al.
(Continued)

FOREIGN PATENT DOCUMENTS

CN 111814722 A * 10/2020 ......... G06K 9/00456
CN 112766073 A 5/2021
(Continued)

OTHER PUBLICATIONS

A table detection, cell recognition and text extraction algorithm to convert tables in images to excel files, https://towardsdatascience.com/a-table-detection-cell-recognition-and-text-extraction-algorithm-to-convert-tables-to-excel-files-902edcf289ec, Accessed Mar. 2, 2022 (14 pages).

(Continued)

*Primary Examiner* — Sean T Motsinger
(74) *Attorney, Agent, or Firm* — Foley & Lardner LLP

(57) ABSTRACT

The present disclosure describes a method, system, and a computer readable medium for extracting tabular data present in a document. The method comprises detecting presence of at least one table in the document using a deep learning based model and a statistical method. The method further comprises identifying a type of the table based on determining a count of horizontal and vertical lines, presence of outer borders, and presence of row-column intersections in the table. The type of the table comprises a bordered table, a partially bordered table, or a borderless table. The method further comprises processing the detected table, depending on its type, to identify one or more cells present in the table. The method further comprises generating an output file by extracting the tabular data present in the table, where the extracting comprises performing optical character recognition on the identified one or more cells.

20 Claims, 8 Drawing Sheets

800

Detecting presence of at least one table in the document using a trained deep learning based model and a statistical method — 802

Determining a count of horizontal and vertical lines, presence of outer borders, and presence of row-column intersections in the at least one table — 804

Identifying, based on a result of the determination, a type of the at least one table from among a bordered table, a partially bordered table, or a borderless table — 806

Processing the detected at least one table, depending on its type, to identify one or more cells present in the at least one table — 808

Generating an output file by extracting the tabular data present in the at least one table, wherein the extracting comprises performing optical character recognition (OCR) on the identified one or more cells — 810

(51) Int. Cl.

| | |
|---|---|
| ***G06V 30/18*** | (2022.01) |
| ***G06V 30/19*** | (2022.01) |
| ***G06V 30/184*** | (2022.01) |

(52) U.S. Cl.
CPC .. *G06V 30/18105* (2022.01); *G06V 30/19173* (2022.01); *G06V 30/414* (2022.01)

(56) References Cited

U.S. PATENT DOCUMENTS

| | | | | |
|---|---|---|---|---|
| 9,990,347 | B2 | 6/2018 | Raskovic et al. | |
| 10,706,228 | B2 | 7/2020 | Buisson et al. | |
| 2013/0191715 | A1 | 7/2013 | Raskovic et al. | |
| 2015/0093021 | A1* | 4/2015 | Xu ....................... | G06V 30/412<br>382/159 |
| 2018/0211106 | A1* | 7/2018 | Kamada ............... | G06V 30/413 |
| 2018/0276462 | A1* | 9/2018 | Davis ..................... | G06V 30/15 |
| 2019/0294399 | A1* | 9/2019 | Yu ........................ | G06V 30/412 |
| 2021/0073326 | A1* | 3/2021 | Aggarwal ............. | G06F 40/103 |

FOREIGN PATENT DOCUMENTS

| | | | |
|---|---|---|---|
| EP | 3 117 369 | A1 | 1/2017 |
| WO | WO-2007/075548 | A1 | 7/2007 |

OTHER PUBLICATIONS

Hao, L., et al., “A Table Detection Method for PDF Documents Based on Convolutional Neural Networks,” 2016 12th IAPR Workshop on Document Analysis Systems, 978-1-5090-1792-8/16, IEEE, pp. 287-292 (2016).

Python—How to detect the horizontal and vertical lines of a table and eliminate the noise? Stack Overflow, https://stackoverflow.com/questions/60521925/how-to-detect-the-horizontal-and-vertical-lines-of-a-table-and-eliminate-the-noi, Accessed Mar. 2, 2022 (6 pages).

Ranka, V., et al., “Automatic Table Detection and Retention from Scanned Document Images via Analysis of Structural Information,” 2017 Fourth International Conference on Image Information Processing (ICIIP), 978-1-5090-6734-3/17, IEEE, pp. 244-249 (2017).

Ren, S., et al., “Faster R-CNN: Towards Real-Time Object Detection with Region Proposal Networks,” https://arxiv.org/abs/1506.01497v3, arXiv:1506.01497v3 [cs.CV], Jan. 6, 2016.

Table Detection and Text Extraction—OpenCV and Pytesseract, https://medium.com/analytics-vidhya/table-detection-and-text-extraction-5a2934f61caa, Accessed Mar. 2, 2022 (19 pages).

* cited by examiner

Figures 4A, 4B:
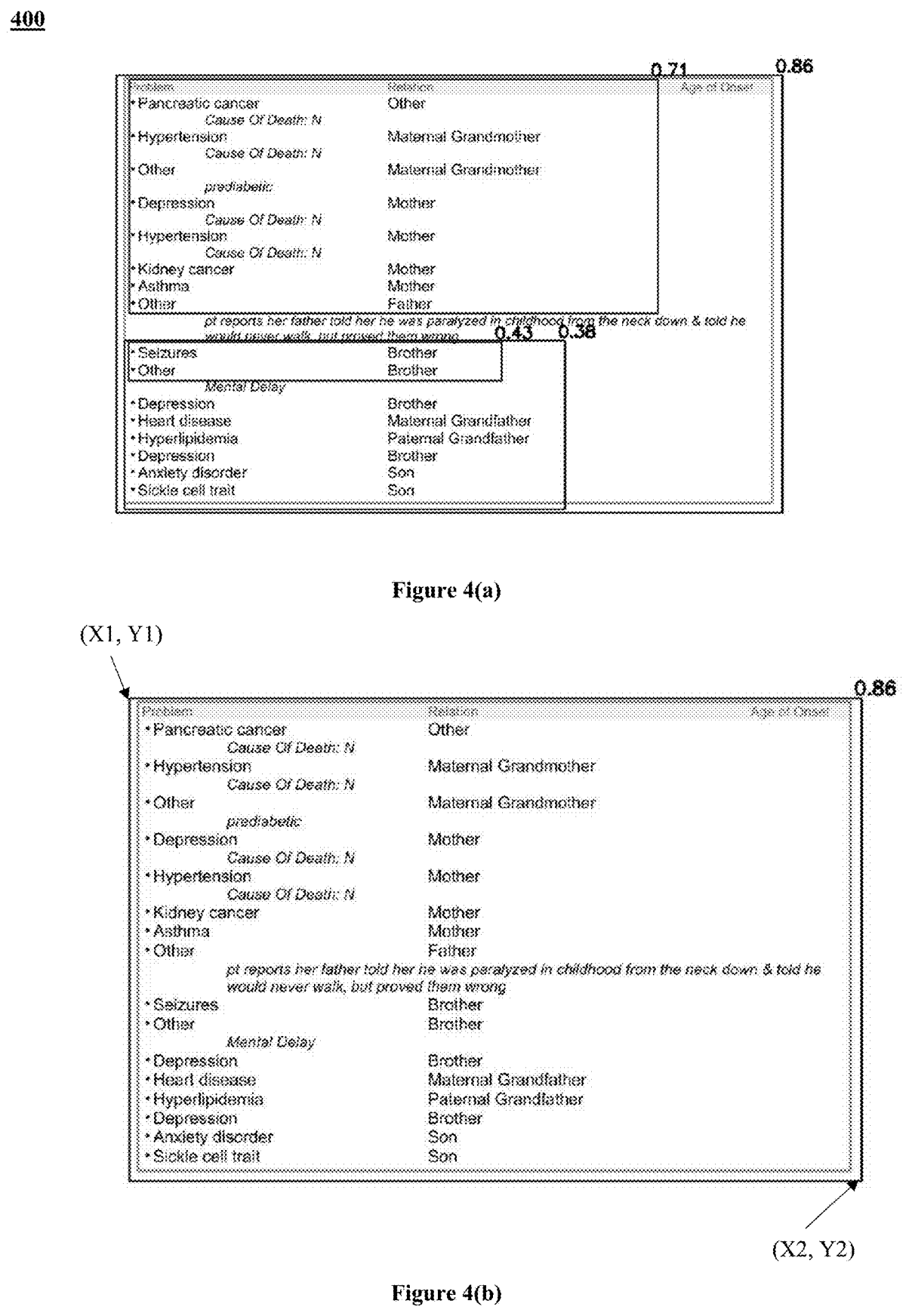

400

| Problem | Relation | Age of Onset |
|---|---|---|
| • Pancreatic cancer *Cause Of Death: N* | Other | |
| • Hypertension *Cause Of Death: N* | Maternal Grandmother | |
| • Other *prediabetic* | Maternal Grandmother | |
| • Depression *Cause Of Death: N* | Mother | |
| • Hypertension *Cause Of Death: N* | Mother | |
| • Kidney cancer | Mother | |
| • Asthma | Mother | |
| • Other *pt reports her father told her he was paralyzed in childhood from the neck down & told he would never walk, but proved them wrong* | Father | |
| • Seizures | Brother | |
| • Other *Mental Delay* | Brother | |
| • Depression | Brother | |
| • Heart disease | Maternal Grandfather | |
| • Hyperlipidemia | Paternal Grandfather | |
| • Depression | Brother | |
| • Anxiety disorder | Son | |
| • Sickle cell trait | Son | |

| Problem | Relation | Age of Onset |
|---|---|---|
| • Pancreatic cancer *Cause Of Death: N* | Other | |
| • Hypertension *Cause Of Death: N* | Maternal Grandmother | |
| • Other *prediabetic* | Maternal Grandmother | |
| • Depression *Cause Of Death: N* | Mother | |
| • Hypertension *Cause Of Death: N* | Mother | |
| • Kidney cancer | Mother | |
| • Asthma | Mother | |
| • Other *pt reports her father told her he was paralyzed in childhood from the neck down & told he would never walk, but proved them wrong* | Father | |
| • Seizures | Brother | |
| • Other *Mental Delay* | Brother | |
| • Depression | Brother | |
| • Heart disease | Maternal Grandfather | |
| • Hyperlipidemia | Paternal Grandfather | |
| • Depression | Brother | |
| • Anxiety disorder | Son | |
| • Sickle cell trait | Son | |

500
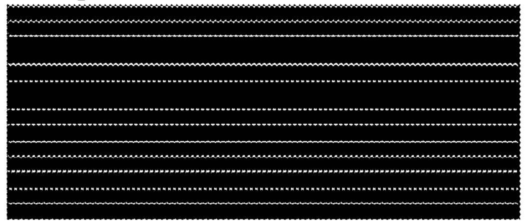
Fig. 5(a) Original image Tab
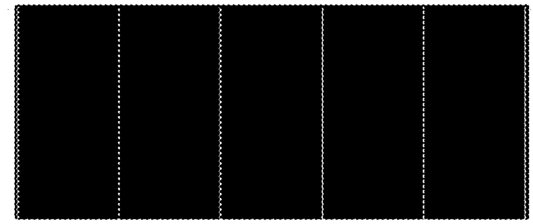
Fig. 5(b) Thresholded and inverted image Tab′
Fig. 5(c) Image with horizontal lines $Tab_{hr}$
Fig. 5(d) Image with vertical lines $Tab_{vr}$
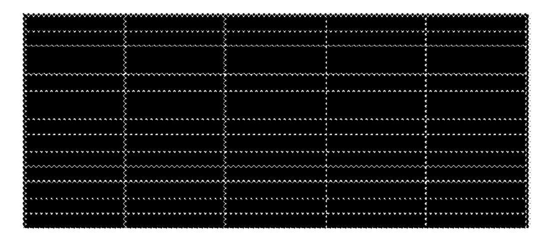
Fig. 5(e) Image with horizontal and vertical lines $Tab_{lines}$
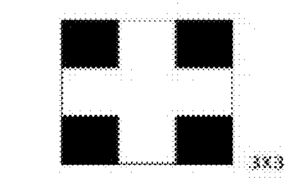
Fig. 5(f) Kernel for detecting row-column intersections $K_{cross}$

600

| # | Detail Type | Description |
|---|---|---|
| 1. | Assessment | Acute pharyngitis, unspecified (J02.9). |
| | Patient Plan | rapid strep negative<br>tc pending<br>Gargle with warm salt water once an hour to help reduce swelling and relieve discomfort. Use 1 teaspoon of salt mixed in 1 cup of warm water.<br>Take an over-the-counter pain medicine, such as acetaminophen (Tylenol), ibuprofen (Advil, Motrin), or naproxen (Aleve). Read and follow all instructions on the label.<br>Be careful when taking over-the-counter cold or flu medicines and Tylenol at the same time. Many of these medicines have acetaminophen, which is Tylenol. Read the labels to make sure that you are not taking more than the recommended dose. Too much acetaminophen (Tylenol) can be harmful.<br>Drink plenty of fluids. Fluids may help soothe an irritated throat. Hot fluids, such as tea or soup, may help decrease throat pain.<br>Use over-the-counter throat lozenges to soothe pain. Regular cough drops or hard candy may also help.<br>rto if symptoms persist or worsen |
| | Plan Orders | The patient had the following test(s) completed today Rapid Strep and Throat culture (Bacterial culture) performed. |

Fig. 6(a) Original Image Tab

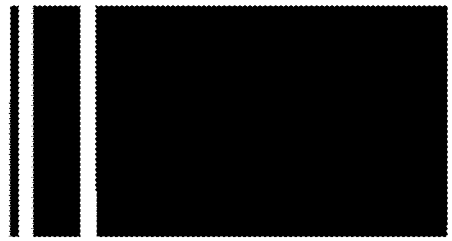

Fig. 6(b) Image with column separators $Tab_{ColSeparators}$

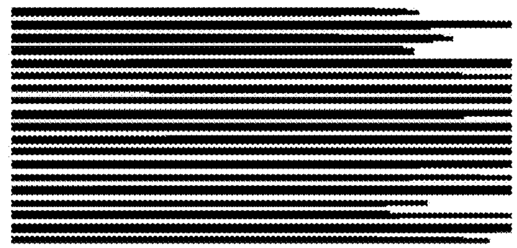

Fig. 6(c) Image with row separators $Tab_{RowSeparators}$

| # | Detail Type | Description |
|---|---|---|
| 1. | Assessment | Acute pharyngitis, unspecified (J02.9). |
| | Patient Plan | rapid strep negative<br>tc pending<br>Gargle with warm salt water once an hour to help reduce swelling and relieve discomfort. Use 1 teaspoon of salt mixed in 1 cup of warm water.<br>Take an over-the-counter pain medicine, such as acetaminophen (Tylenol), ibuprofen (Advil, Motrin), or naproxen (Aleve). Read and follow all instructions on the label.<br>Be careful when taking over-the-counter cold or flu medicines and Tylenol at the same time. Many of these medicines have acetaminophen, which is Tylenol. Read the labels to make sure that you are not taking more than the recommended dose. Too much acetaminophen (Tylenol) can be harmful.<br>Drink plenty of fluids. Fluids may help soothe an irritated throat. Hot fluids, such as tea or soup, may help decrease throat pain.<br>Use over-the-counter throat lozenges to soothe pain. Regular cough drops or hard candy may also help.<br>rto if symptoms persist or worsen |
| | Plan Orders | The patient had the following test(s) completed today Rapid Strep and Throat culture (Bacterial culture) performed. |

Fig.6(d) Image with vertical lines

| # | Detail Type | Description |
|---|---|---|
| 1. | Assessment | Acute pharyngitis, unspecified (J02.9). |
| | Patient Plan | rapid strep negative |
| | | tc pending |
| | | Gargle with warm salt water once an hour to help reduce swelling and relieve discomfort. |
| | | Use 1 teaspoon of salt mixed in 1 cup of warm water. |
| | | Take an over-the-counter pain medicine, such as acetaminophen (Tylenol), ibuprofen (Advil, Motrin), or naproxen (Aleve). Read and follow all instructions on the label. |
| | | Be careful when taking over-the-counter cold or flu medicines and Tylenol at the same time. Many of these medicines have acetaminophen, which is Tylenol. Read the labels to make sure that you are not taking more than the recommended dose. Too much acetaminophen (Tylenol) can be harmful. |
| | | Drink plenty of fluids. Fluids may help soothe an irritated throat. Hot fluids, such as tea or soup, may help decrease throat pain. |
| | | Use over-the-counter throat lozenges to soothe pain. Regular cough drops or hard candy may also help. |
| | | rto if symptoms persist or worsen |
| | Plan Orders | The patient had the following test(s) completed today Rapid Strep and Throat culture (Bacterial culture) performed. |

Fig.6(e) Image with horizontal lines

| # | Detail Type | Description |
|---|---|---|
| 1. | Assessment | Acute pharyngitis, unspecified (J02.9). |
| | Patient Plan | rapid strep negative<br>tc pending<br>Gargle with warm salt water once an hour to help reduce swelling and relieve discomfort.<br>Use 1 teaspoon of salt mixed in 1 cup of warm water.<br>Take an over-the-counter pain medicine, such as acetaminophen (Tylenol), ibuprofen (Advil, Motrin), or naproxen (Aleve). Read and follow all instructions on the label.<br>Be careful when taking over-the-counter cold or flu medicines and Tylenol at the same time. Many of these medicines have acetaminophen, which is Tylenol. Read the labels to make sure that you are not taking more than the recommended dose. Too much acetaminophen (Tylenol) can be harmful.<br>Drink plenty of fluids. Fluids may help soothe an irritated throat. Hot fluids, such as tea or soup, may help decrease throat pain.<br>Use over-the-counter throat lozenges to soothe pain. Regular cough drops or hard candy may also help.<br>rto if symptoms persist or worsen |
| | Plan Orders | The patient had the following test(s) completed today Rapid Strep and Throat culture (Bacterial culture) performed. |

Fig.6(f) Final table image with horizontal and vertical lines

700

END-TO-END SYSTEM FOR EXTRACTING TABULAR DATA PRESENT IN ELECTRONIC DOCUMENTS AND METHOD THEREOF

TECHNICAL FIELD

The present disclosure generally relates to the technical field of data processing and information retrieval. Particularly, the present disclosure relates to an end-to-end system and a method for extracting tabular data present in electronic documents.

BACKGROUND

With the rapid growth in information technology, the amount of data being collected in healthcare space is drastically increasing day-by-day. To access and exchange this huge amount of data, it is necessary to develop efficient information extraction and information exchange tools. Electronic documents are increasingly becoming popular for exchange of information as they offer instantaneous transmission and distribution of information to a large number of recipients. Searching, locating, and retrieving data and/or information from an electronic document or from a repository of electronic documents may be referred to as information retrieval or data extraction. The data extraction may involve processing of the electronic document(s) for extracting layout of the document(s) and then content. The documents may include lab reports, medical invoices, electronic health records, explanation of benefit, digital purchase receipts, invoices etc.

With the adoption of electronic data in the healthcare space, there is an increase in demand to find the best ways to retrieve relevant information from electronic medical documents to help various stakeholders, such as doctors, patients, hospitals, and insurance companies. Medical documents may contain useful information in the form of text, images, and tables. One of the sub-areas that is demanding attention is the fetching and accessing of data from tabular forms. Generally, medical documents include a plurality of tables for providing visual grouping of information. Tables are an effective and compact way of displaying information as they facilitate readers to quickly interpret and understand data present in the medical documents. Tables present in the medical documents contain useful information like clinical analysis and laboratory results which are useful for research, studying healthcare trends, data mining, planning patient care, medical investigations, clinical support system, and quality improvement. Hence, it becomes essential to retrieve data and/or information from the tables present in the medical documents. However, extracting the content present in the tabular structures demands to preserve the essence of the content. Further, extracting information from tables requires understanding the structure and layout of the medical document which is an unstructured document because different hospitals and/or doctors have their different formats.

Traditional approaches of extracting content from tables require human in the loop to verify the content and correct it, which is laborious and time-consuming. Many existing systems for extracting tabular data present in the medical documents are rule-based. However, the rule based systems require a lot of manual work and deep knowledge of the domain. Also, generating rules for a complex system is a quite challenging and time consuming task. Since the medical documents may have different formats and languages, the rule-based techniques require constant updating of rules, which again is troublesome and time consuming. Some tabular content extraction approaches utilize optical character recognition (OCR) to convert the medical documents into a machine readable and editable form. When an optical character recognition system encounters a table, it reads the content of the table line by line, which infringes the integrity of table contents. Hence, there is a requirement for the system, which helps to preserve the contents of the tabular.

Further, the tables present in the unstructured medical documents may include bordered tables, borderless tables, and partial bordered tables. The existing data extraction techniques lack the ability to identify a borderless table, which is quite common in medical documents. Thus, tabular data extraction from the medical documents is still regarded as a complex problem and it is desirable to develop efficient techniques for extracting data from the medical documents. Hence, there exists a need for further improvements in the technology, especially for techniques that can efficiently extract tabular data present in electronic documents.

The information disclosed in this background section is only for enhancement of understanding of the general background of the invention and should not be taken as an acknowledgement or any form of suggestion that this information forms the prior art already known to a person skilled in the art.

SUMMARY

One or more shortcomings discussed above are overcome, and additional advantages are provided by the present disclosure. Additional features and advantages are realized through the techniques of the present disclosure. Other embodiments and aspects of the disclosure are described in detail herein and are considered a part of the disclosure.

An object of the present disclosure is to provide an end-to-end system for extracting tabular content present in medical documents.

Another objective of the present disclosure is to extract the tabular content from a wide range of medical documents with high accuracy.

The above stated objects as well as other objects, features, and advantages of the present disclosure will become clear to those skilled in the art upon review of the following description, the attached drawings, and the appended claims.

According to an aspect of the present disclosure, methods, apparatus, and computer readable media are provided for extracting tabular data present in a document.

In a non-limiting embodiment of the present disclosure, the present application discloses a method for extracting tabular data present in a document. The method comprises detecting presence of at least one table in the document using a trained deep learning based model and a statistical method and determining a count of horizontal and vertical lines, presence of outer borders, and presence of row-column intersections in the at least one table. The method further comprises identifying, based on a result of the determination, a type of the at least one table from among a bordered table, a partially bordered table, or a borderless table; and processing the detected at least one table, depending on its type, to identify one or more cells present in the at least one table. The method comprises generating an output file by extracting the tabular data present in the at least one table, where the extracting comprises performing optical character recognition (OCR) on the identified one or more cells.

In another non-limiting embodiment of the present disclosure, the present application discloses an end-to-end system for extracting tabular data present in a document. The system comprises a memory storing computer executable instructions; and at least one processor in electronic communication with the memory. The processor is configured to detect presence of at least one table in the document using a trained deep learning based model and a statistical method and determine a count of horizontal and vertical lines, presence of outer borders, and presence of row-column intersections in the at least one table. The processor is further configured to identify, based on a result of the determination, a type of the at least one table from among a bordered table, a partially bordered table, or a borderless table; and process the detected at least one table, depending on its type, to identify one or more cells present in the at least one table. The processor is further configured to generate an output file by extracting the tabular data present in the at least one table, where the extracting comprises performing optical character recognition (OCR) on the identified one or more cells.

In another non-limiting embodiment of the present disclosure, the present application discloses a non-transitory computer readable media storing one or more instructions executable by at least one processor for extracting tabular data present in a document. The one or more instructions comprises one or more instructions for detecting presence of at least one table in the document using a trained deep learning based model and a statistical method and one or more instructions for determining a count of horizontal and vertical lines, presence of outer borders, and presence of row-column intersections in the at least one table. The one or more instructions further comprise one or more instructions for identifying, based on a result of the determination, a type of the at least one table from among a bordered table, a partially bordered table, or a borderless table. The one or more instructions further comprise one or more instructions for processing the detected at least one table, depending on its type, to identify one or more cells present in the at least one table; and one or more instructions for generating an output file by extracting the tabular data present in the at least one table, where the extracting comprises performing optical character recognition (OCR) on the identified one or more cells.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below, are incorporated in and form part of the specification, and serve to further illustrate the embodiments and explain various principles and advantages, in accordance with the present disclosure wherein:

FIGS. 4(*a*)-(*b*) show exemplary illustrations for selecting a single table predictions from multiple overlapping table predictions, in accordance with some embodiments of the present disclosure.

FIGS. 5(*a*)-(*f*) show a step by step flow 500 for classifying an input image, in accordance with some embodiments of the present disclosure.

FIGS. 6(*a*)-(*f*) show a step by step flow 600 for identifying row and column separators in borderless tables, in accordance with some embodiments of the present disclosure.

Figure 1:
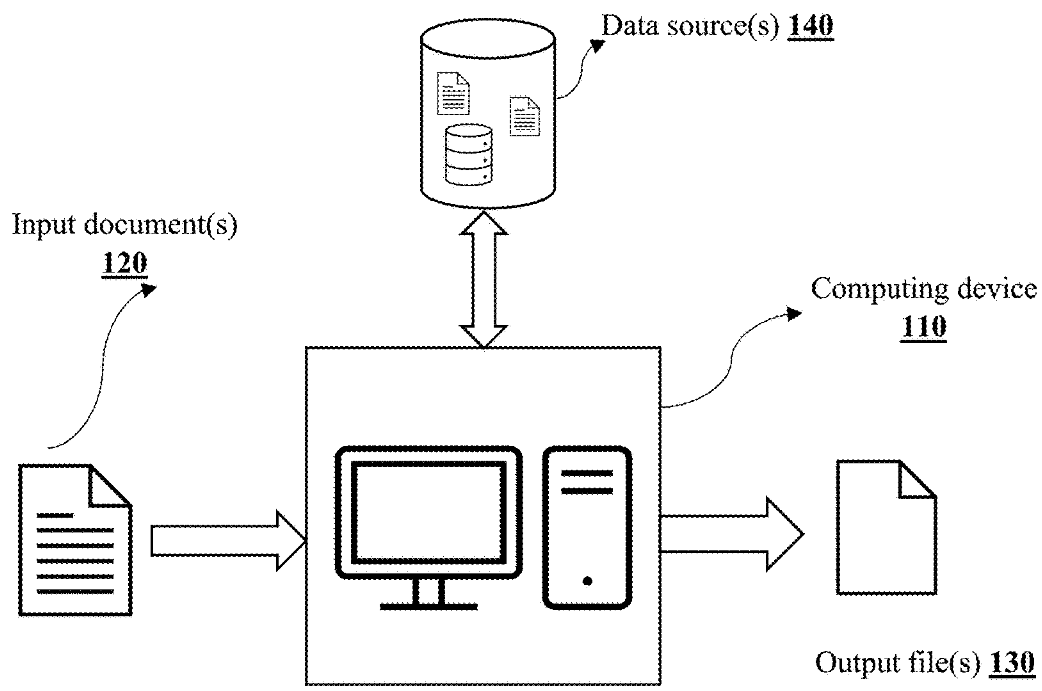
FIG. 1 shows an exemplary system 100 for extracting tabular content from a variety of table structures present in documents, in accordance with some embodiments of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The terms like "at least one" and "one or more" may be used interchangeably throughout the description. The terms like "a plurality of" and "multiple" may be used interchangeably throughout the description. The terms like "medical document", "medical health document" may be used interchangeably throughout the description.

In the present disclosure, the term "medical document" or "electronic medical document" is used within the context of its broadest definition. A medical document may include, but not limited to, lab reports, medical invoices, electronic health records (EHR), explanation of benefit (EOB), electronic medical record (EMR) etc. The medical document may comprise both structured and unstructured data which could be in any form including, but not limited to, texts, images, word files, web pages, excel, Portable Document Formats (PDFs), or a combination thereof.

As discussed in the background section, with the adoption of electronic data in the healthcare space, there is an increase in demand to find the best ways to extract relevant information from the medical documents to help various stakeholders including, but not limited to, doctors, patients, hospitals, and insurance companies. The medical documents generally do not have a fixed format (i.e., the medical documents are unstructured), making it difficult for a logic to extract information from these documents. For instance, the tables present in the unstructured medical documents generally contain information which is useful for research, providing better services, medical investigations, quality improvement etc. However, extracting data from tables present in the various medical documents including, but not limited to, lab reports, medical invoices, electronic health records, explanation of benefit etc. is still regarded as a complex problem.

For example, an electronic health record (EHR) is usually an unstructured document because different hospitals and doctors have different formats. Each doctor creates the EHR in his/her own style which makes the problem of table content extraction more complex. Further, mostly physicians prefer to represent critical information in tabular format for the vital signs, medications, history of illness, and immunization. However, most of these tables are borderless, which hinders extracting the text using the traditional optical character recognition (OCR) approach.

An Explanation of Benefit (EOB) is a statement sent by a health insurance company to covered individuals explaining what medical treatments and/or services were paid for on their behalf. However, it contains information in tabular format related to patient, diagnosis, and amount which the insurance companies will reimburse. Currently, hospitals open the EOB for each patient for billing purposes and process the information manually, thereby reducing the overall productivity. Moreover such processing is prone to human errors.

A lab reports is created by technicians/radiologists and contains information about diagnosis/results in tabular structure for easy interpretation by humans. A medical invoice contains information present in the table like format with varying size and length. The information is present in descriptions, cost associated with each transaction, procedures, drugs, duration, dosage, units etc. However, it is hard for computers to read the lab reports and/or the medical invoices and extract the relevant information automatically because the traditional approaches are mostly applicable to a fixed structure of documents, i.e. laboratory reports/medical invoice with a fixed structure and with fixed number of tables.

Nowadays, few machine/deep learning based models for extracting tabular content have been proposed. Due to various compliances (e.g., Health Insurance Portability and Accountability Act (HIPPA) privacy rule), the healthcare sector is hesitant in sharing patient medical documents because these documents contain personal identifiable information (e.g., Protected Health Information (PHI)) about patients. Thus, due to the limited number of samples, it is challenging to train the machine/deep learning based models for extracting tabular content and hence these models do not provide optimal performance in extracting the tabular content present in the medical documents. Moreover, these approaches are time consuming because they require human powered high quality annotation of training data. Further, training of such models consumes significant amount of computing resources.

Due to the above-mentioned challenges, extracting tabular content from medical documents is still regarded as a complex problem and it is desirable to develop efficient techniques which can extract tabular contents from the medical documents of any type. To overcome these and other problems, the present disclosure proposes an end-to-end system which can automatically extract the tabular data present in medical documents irrespective of type of medical document (i.e., whether a medical document is structured or unstructured) and irrespective of type of tables (i.e., whether a table is bordered, borderless, colored, or partial bordered).

Referring now to FIG. 1, which illustrates a generic end to end system 100 for extracting content from a variety of table structures present in documents, in accordance with some embodiments of the present disclosure. The system 100 may comprise a computing device 110 which may be in communication with one or more data sources 140. The one or more data sources 140 may comprise at least one medical document for training one or more models at the computing device 110. The at least one medical document may include paper and/or computer based medical documents including lab reports, medical invoices, electronic health records, explanation of benefit, digital purchase receipts, electronic medical records, patient's clinical records, diagnostic reports, discharge summary, prescription, case sheets, investigation reports, blood test reports, patient's medical history, and medication records etc. The computing device 110 may receive at least one document 120 which may contain at least one tabular structure. The computing device 110 may then perform various operations on the received document 120 for extracting the content from the tabular structure of the document and may generate an output file 130 with the extracted content.

Figure 2:
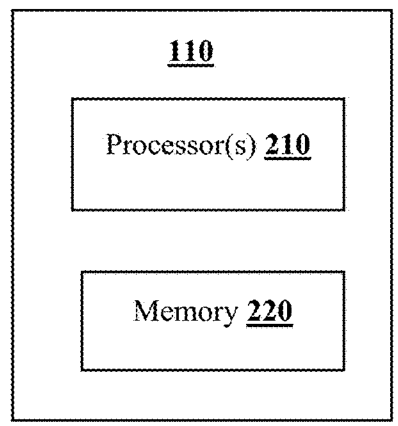
FIG. 2 shows a block diagram 200 of the system 100 illustrated in FIG. 1, in accordance with some embodiments of the present disclosure.

Now, FIG. 1 is explained in conjunction with FIG. 2, which shows a block diagram 200 of the system 100, in accordance with some embodiments of the present disclosure. According to an embodiment of the present disclosure, the system 100 may comprise the computing device 110 which may comprise at least one processor 210, at least one first memory 220, and at least one first transceiver (not shown).

The at least one processor 210 may include, but not restricted to, a general-purpose processor, a Field Programmable Gate Array (FPGA), an Application Specific Integrated Circuit (ASIC), a Digital Signal Processor (DSP), microprocessors, microcomputers, micro-controllers, central processing units, state machines, logic circuitries, and/or any devices that manipulate signals based on operational instructions. A processor may also be implemented as a combination of computing devices, e.g., a combination of a DSP and a microprocessor, a plurality of microprocessors, one or more microprocessors in conjunction with a DSP core, or any other such configuration.

The memory 220 may be communicatively coupled to the at least one processor 210 and may comprise various instructions, one or more datasets, and one or more medical documents etc. The memory 220 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

The system 100 proposed in the present disclosure may be named as document extractor which automatically extracts content from tables for any given input medical document. In one non-limiting embodiment of the present disclosure, the at least one first processor 210 may receive at least one medical document 120 (which is having one or more tabular structures) from a user. For example, a user may upload the medical document 120 on the computing device 110. In one non-limiting embodiment of the present disclosure, the at least one first processor 210 may fetch/extract at least one medical document 120 from a data source. The at least one processor 210 may then process the received/fetched medical document 120 for extracting tabular data contained in the medical document 120. The processing of the medical document 120 by the system 100 may include four major stages: table detection 320, table type classification 330, table cell detection 340, and table cell content extraction 350, as described in FIG. 3. In an embodiment, the processing of the medical document 120 may further include one additional stage of pre-processing 310.

Figure 3:
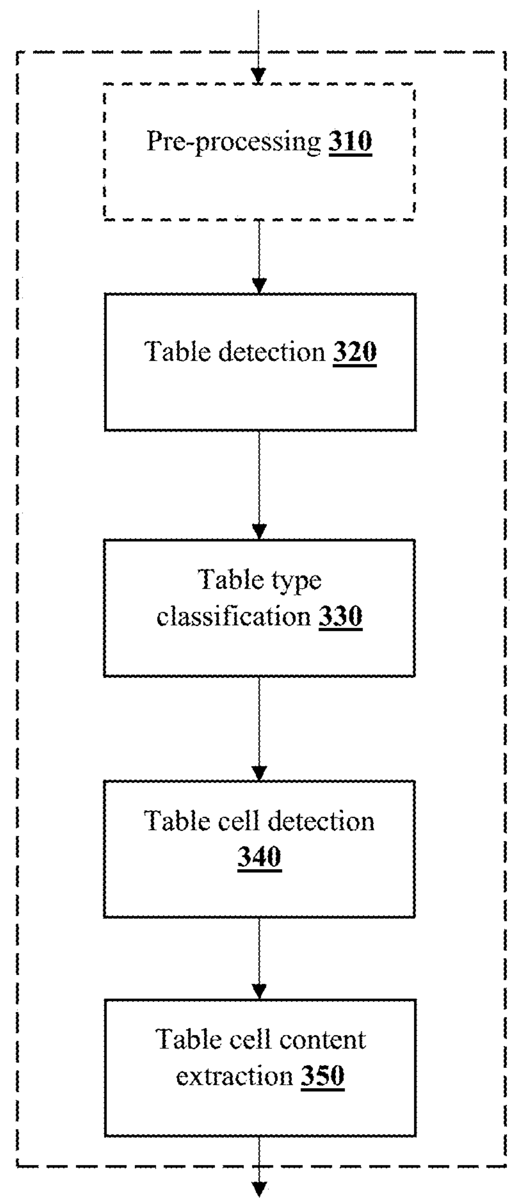
FIG. 3 shows a process flow diagram 300 for extracting tabular data present in a document, in accordance with some embodiments of the present disclosure.

Referring now to FIG. 3, which illustrates a process flow diagram 300 for extracting tabular data present in a document, in accordance with some embodiments of the present disclosure. For any given input medical document having at least one table, the proposed system 100 returns the content present in the document's tables in a predefined format (e.g., JSON format, but not limited thereto). The table detection stage 320 returns co-ordinates for the at least one table present in the medical documents along with prediction confidence scores corresponding to the at least one table. For the detected at least one table, a table type classification stage 330 returns a type of the detected table among bordered, partially bordered, borderless, or colored tables. Based on the predictions of the table type classification, the table cell detection stage 340 returns the list of co-ordinates for detected cells within the table. Finally, the present disclosure utilizes an OCR engine to extract the content of detected cells in table (350). The various processing stages 310-350 of FIG. 3 are now described in the forthcoming paragraphs.

Pre-Processing Stage (310):

The at least one processor 210 may receive or fetch the input medical document 120. Once the input medical document 120 is received at the computing device 110, the at least one processor 210 may perform pre-processing on the input medical document 120. The at least one processor 210 may convert the input medical record 120 (which may be in any format including, but not limited to, text, images, word files, web pages, excel, PDFs etc.) into a defined format (e.g., image). For instance, if the input medical document 120 is a PDF of N pages, the at least one processor 210 may convert the input PDF document into a list of N images. In one non-limiting embodiment, if the received document is protected by a password, the user may need to provide password to process the input document. In one non-limiting embodiment, the at least one processor 210 may also perform skew correction and page orientation correction on the input medical document 120. The pre-processing may improve accuracy of further processing stages and save computing resources.

Table Detection (320):

While dealing with table detection in medical documents, a number of challenges are faced. For example, medical documents are usually unstructured i.e., do not have fixed formats and usually have variations in their structures (e.g., each of diagnostic reports, discharge summary, medical invoices etc. have different formats). Also, the tables present in the medical documents are of different types. Thus, there is a need of an approach that can be generalized to different variations in tables and structures of the medical documents. Another challenge faced is that the tables are present at different scales in medical documents. Yet another challenge faced is that the techniques of detecting tables in medical documents usually provide multiple overlapping predictions for a single table. Thus, it is required to select a single table prediction from the plurality of falsely predicted tables/sub-tables.

To overcome these challenges, the present disclosure proposes a two-stage transfer learning approach which uses a deep learning based technique combined with a statistical technique for detecting tables (bordered tabled, partially bordered tables, or borderless tables) in a wide variety of the medical documents. In general, the transfer learning is a machine learning (ML) technique where knowledge gained while solving one problem may be applied to solve a different but related problem (i.e., a model developed/trained on one task may be used on a different but related task).

The deep learning based technique utilizes a trained deep network for detecting tables present in the medical documents. The deep network is initialized with MS COCO weights followed by fine-tuning on publicly available table detection and recognition datasets (e.g., TableBank). The deep learning based architecture uses a dual backbone, one the assistant and the other, the lead, with composite connections between the two, forming a robust backbone. The high-level features learnt from the assistant backbone are fed as an input to the lead backbone. This powerful backbone helps in handling a wide variations of medical documents and increase the performance of table detection. The deep learning based architecture has better generalization ability compared to other approaches. Further, to have scale-invariant table detection, the deep learning based technique uses deformable convolutional neural networks (CNNs) that ensure that receptive field is adaptive according to scale of tables, thus ensuring that tables at all scales are captured correctly. The deep learning based technique provides coordinates of the detected tables along with confidence scores for each table as its output.

It may be noted that the deep learning based technique may provide multiple false tables or sub-tables for a single tabular structure. For instance, the deep learning based technique may provide multiple overlapping table predictions for a single tabular structure, as shown in FIG. 4(*a*). To select a single table prediction from the multiple overlapping table predictions, the proposed system 100 may utilize a statistical method for selecting a single table prediction from the multiple overlapping table predictions based on the confidence scores or probabilities, as shown in FIGS. 4(*a*)-

4(*b*). In one non-limiting embodiment, the statistical method may be Non Maximal Suppression (NMS).

Referring now to FIGS. 4(*a*) and 4(*b*), which show an illustration 400 applying NMS to predictions made by the deep learning based technique, in accordance with some embodiments of the present disclosure. Green and blue colored rectangles as shown FIG. 4 correspond to ground truth and predicted bounding boxes, respectively. Confidence score or probability of the prediction is shown at the top-right corner of the bounding boxes. FIG. 4(*a*) shows the table image depicting overlapping predictions (before applying NMS). FIG. 4(*b*) shows the table image depicting single prediction selected out of the overlapping predictions (after applying NMS).

In one non-limiting embodiment, the NMS may first select the table prediction having the highest confidence score and then compute intersection over union (IOU) of the selected table prediction with the remaining table predictions of the multiple table predictions and discards the predictions having IOU less than a given threshold. This may be performed recursively until all predictions of the image are covered. In this manner, the stage 320 detects all types tables present in different types of medical documents. The output of stage 320 is a single prediction for a tabular structure in the form of table coordinates (X1, Y1) and (X2, Y2) corresponding to top right and bottom left corner of a table. The various operations of stage 320 may be implemented with the help of the processor 210.

Table Type Classification (330):

Once the table has been detected in the input medical document 120, the at least one processor 210 may identify a type of the detected table at stage 330. The tables present in the medical documents may include bordered tables, borderless tables, partial bordered tables, and colored tables. The existing data extraction techniques have low performance for extracting content from partial bordered or borderless table, which are quite common in medical documents. Table type classification stage 330 is an integral sub-module of the document extractor pipeline because the processing stages for downstream tasks (i.e., table cell detection 340 and table cell content extraction 350) depend on a type of the table. Following Occam's Razor Principle, instead of choosing complex and resource intensive deep learning based approach, the present disclosure uses simplified computer vision based approaches that use information of vertical lines, horizontal lines, and white patch in table region for table type classification.

Referring now to FIGS. 5(*a-f*) which show step by step flow 500 for classifying an input image, in accordance with some embodiments of the present disclosure. FIG. 5(*a*) illustrates an input image Tab which is received from the table detection stage 320. The at least one processor 210 may then process the input image Tab to obtain a thresholded and inverted image Tab'. Thresholding may convert the input image (Tab) into a binary image which is then inverted to get a black background and white lines/fonts (Tab'), as shown in FIG. 5(*b*). Thresholding is an image processing technique which is used to convert a grey scale image (having pixels ranging from 0-255) into a binary image (having pixel values as either 0 or 1). Thresholding compares intensity value of each pixel in an image with a predefined threshold (T) and replaces the pixel with a black pixel if the pixel intensity value is less than threshold, else replaces the pixel with a white pixel. If I(i, j) is the intensity value of any pixel at point (i, j) in an image, then:

$$I(i,j)=0 \text{ if } I(i,j)<T$$

$$\text{else } I(i,j)=1 \tag{1}$$

In an embodiment, the thresholding techniques used here is Otsu's thresholding, where a value of the threshold (T) is calculated automatically instead of being chosen randomly. Otsu's thresholding technique assumes that the table image contains two distinct classes of pixels (i.e., foreground and background pixels), it then calculates an optimum value of threshold (T) separating the two classes where a sum of foreground and background spreads is minimum.

The table image obtained after applying Otus's thresholding is then inverted to obtain a thresholded and inverted image (Tab'), as shown in FIG. 5(*b*). In general, inverting is an image processing technique where foreground and background colors are interchanged (i.e., light areas are mapped to dark and dark areas are mapped to light). In a non-limiting aspect, the inverted image may contain 1's for text regions and 0's for background regions. The thresholding and inverting are performed because the downstream tasks (i.e., detecting horizontal/vertical lines) perform well with binary images.

Next, the at least one processor 210 processes the binary image (Tab') by applying morphological operations (i.e., erosion and dilation) using dynamic parameterized horizontal and vertical kernels to detect presence of horizontal and vertical lines in the table image (Tab). During this processing, the processor 210 looks for empty rows and columns that do not contain any characters or content. Instead of using fixed-sized kernels, the present disclosure uses dynamic horizontal ($K_{hr}$) and vertical kernels ($K_{vr}$) which are parameterized on the size of the table image. The kernels are matrices of 0's and 1's and are much smaller in size than the image being processed. The horizontal ($K_{hr}$) and vertical kernels ($K_{vr}$) look like:

$$K_{hr}=[1111\ldots1]_{1\times int(Tab_w * K_w)} \tag{2}$$

$$K_{vr}=[1111\ldots1]_{int(Tab_h * K_h)\times 1} \tag{3}$$

where, $Tab_w$ and $Tab_h$ are width and height respectively of the table (Tab). $K_w$ and $K_h$ are hyperparameters kernel width and kernel height which are fine-tuned based on the table width and height. In an aspect, the horizontal and vertical kernels are matrices of pixels and may also be referred as image kernels or structuring elements.

$$Tab_{hr}=(Tab' \ominus K_{hr}) \oplus K_{hr} \tag{4}$$

$$Tab_{vr}=(Tab' \oplus K_{vr}) \ominus K_{vr} \tag{5}$$

where, $Tab_{hr}$ and $Tab_{vr}$ are table images with only horizontal lines and vertical lines, respectively. Symbols $\ominus$ and $\oplus$ denote erosion and dilation operations respectively. In dilation, the value of output pixel is the maximum value of all the image pixels that fall within the kernel's size and shape. While in erosion, the value of output pixel is the minimum value of all the pixels that fall within the kernel's size and shape. The dilation operation makes objects more visible while erosion removes small objects so that only substantive objects remain.

The at least one processor 210 may process the table image (Tab') by applying the morphological operations using the horizontal kernel ($K_{hr}$), as shown in equation (4). During processing, when the horizontal kernel ($K_{hr}$) slides on the image (Tab'), a pixel is considered only if all pixels are 1 under the horizontal kernel. As the horizontal kernel ($K_{hr}$) slides on the image (Tab') from top to bottom, only the horizontal lines remain while the text and vertical lines get erased due to application of the morphological operations. This way an image with only horizontal lines ($Tab_{hr}$) is obtained by application of equation (4), as shown in FIG. 5(*c*).

After processing the image (Tab) using the horizontal kernel ($K_{hr}$), the at least one processor 210 may process the table image (Tab') by applying the morphological operations using the vertical kernel ($K_{vr}$), as shown in equation (5). During processing, when the vertical kernel ($K_{vr}$) slides on the image (Tab'), a pixel is considered only if all pixels are 1 under the vertical kernel. As the vertical kernel ($K_{vr}$) slides on the image (Tab') from left to right, only the vertical lines remain while the text and horizontal lines get erased due to the application of morphological operations. This way an image with only vertical lines ($Tab_{vr}$) is obtained by application of equation (5), as shown in FIG. 5(*d*). In summary, equation (4) tries to detect horizontal long pattern of l's in the image (Tab) and equation (5) tries to detect vertical long pattern of l's in the image (Tab').

Once the images $Tab_{vr}$ and $Tab_{hr}$ are generated, the at least one processor 210 may count the number of lines in the images $Tab_{vr}$ and $Tab_{hr}$ using line detection techniques. For example, the at least one processor 210 may utilize Hough Line Transform to find the number of horizontal lines ($Count_{hr}$) and vertical lines ($Count_{vr}$) from the images $Tab_{hr}$ and $Tab_{vr}$ respectively. When the values of $Count_{hr}$ and $Count_{vr}$ is zero for any table image, then it is a borderless table image.

In one non-limiting embodiment, the at least one processor 210 may add the images with horizontal and vertical lines ($Tab_{hr}$ and $Tab_{vr}$) using bitwise OR operations (as shown in equation (6)) to generate a combined image ($Tab_{lines}$) having both vertical and horizontal lines, as shown in FIG. 5(*e*).

$$Tab_{lines}=Tab_{hr}|Tab_{vr} \tag{6}$$

The at least one processor 210 may then determining presence of outer borders in the combined table image $Tab_{lines}$. For determining the presence of outer borders, the processor 210 may utilize the table co-ordinates (X1, Y1) and (X2, Y2) which are provided by the table detection stage 320. If there is a line with co-ordinates (X1, Y1) and (X2, Y1) in $Tab_{lines}$, then it indicates presence of the top border. Similarly, if there is a line with co-ordinates (X1, Y2) and (X2, Y2) in $Tab_{lines}$, then it indicates presence of the bottom border. Similarly, the at least one processor 210 checks for the presence of left and right borders in the table image.

In one non-limiting embodiment, the at least one processor 210 may check the presence of row-column intersections in the table image $Tab_{lines}$. The at least one processor 210 may use a kernel ($K_{cross}$) of fixed size 3×3 to find the row-column intersections.

$$K_{cross}=\begin{bmatrix}0&1&0\\1&1&1\\0&1&0\end{bmatrix}_{3\times3} \tag{7}$$

The at least one processor 210 may check the occurrence of a pattern/matrix as shown in FIG. 5(*f*). The at least one processor 210 may use hit-or-miss transform to find if the kernel $K_{cross}$ exists in the image $Tab_{un}$, or not. In general, the hit-or-miss transform is a morphological operation which can detect a given pattern in a binary image. A single occurrence of the kernel K cross in the image $Tab_{lines}$ signifies the presence of row-column intersections in the image $Tab_{lines}$. The occurrence of kernel $K_{cross}$ in the image $Tab_{lines}$ denotes the position of a row separator (e.g., horizontal line) intersecting with a column separator (e.g., vertical line).

The at least one processor 210 may then identify a type of the table (Tab) from among a bordered table, a partially bordered table, or a borderless table based on the count of horizontal and vertical lines, the presence of outer borders, and the presence of row-column intersections in the table (Tab). The table (Tab) is classified as a borderless table when the count of horizontal and vertical lines ($Count_{hr}$ and $Count_{vr}$) is zero and the outer borders are absent. The table (Tab) is identified as a bordered table when both the row-column intersections and the outer borders are present. The table (Tab) is identified as a partial bordered table when either a count of row-column intersections is non-zero and the outer borders are absent; or when a count of row-column intersections is zero and the outer borders are present.

Sometimes, the presence of different color patterns in a table plays an important role in identifying the content present within the table. For instance, a difference in intensities of colors of two adjacent rows may provide a hint that there is a row separator between the of two adjacent rows of the table. This color transition information may be used to identify row and column separators in the table. Hence, the at least one processor may determine whether the table (Tab) is a colored table or not. In one non-limiting embodiment, the at least one processor 210 may determine whether the table (Tab) is a colored tables or not depending on a count of foreground and background pixels. For a colored table, the count of foreground pixels much higher than the count of background pixels. The at least one processor 210 may compute the ratio of second highest and highest intensities from histogram of grayscale table image (Tab). If the ratio is higher than a certain threshold ($Th_{color}$) then the table (Tab) may be classified as the colored table.

The output of stage 330 (i.e., a table type along with its co-ordinates) is provided as input to next processing stage of table cell detection 340.

Table Cell Detection (340):

In one non-limiting embodiment, the at least one processor 210 may utilize a computer vision based approach for detecting cells present in the detected table. The table cell detection uses different methodologies for different types of tables. For bordered tables, cell regions can be detected by identifying contours from the table image $Tab_{lines}$ (equation (6)). The contours can be identified by applying contour detection techniques on the table image $Tab_{lines}$. In general, contours may be defined as the line joining all the points along the boundary of an image that are having the same intensity.

However, since the borderless and partially bordered tables do not contain horizontal and vertical lines, it is not possible to detect contours by applying contour detection techniques. Thus, to detect cells in partially bordered tables, the at least one processor 210 may first convert the partially bordered tables into borderless tables and then follow the same strategy as used for cell detection in the borderless tables. For converting a partially bordered table into a borderless table, the processor 210 may first remove existing borders (i.e., horizontal and vertical lines) from table image ($Tab_{lines}$) of the partial bordered table. Removing the existing borders may comprise taking negation of the horizontal and vertical lines (i.e., filling the horizontal and vertical lines with the background color of table image (Tab)).

To detect cells in the borderless tables, the at least one processor 210 may initially convert the borderless tables into bordered tables and then follow same strategy as used in the bordered tables for detecting cells. For converting the borderless tables into the bordered tables, the processor 210 may identify row and column separators, as explained in the forthcoming paragraphs and as shown in FIG. 6. There may be several challenges while identifying row and column separators in a borderless tables including: (i) locating horizontal and vertical white patches in the borderless table and (ii) handling rows which span over multiple lines of text which are very common in medical documents.

Referring now to FIG. 6 which shows a step by step flow 600 for identifying row and column separators in borderless tables, in accordance with one embodiment of the present disclosure. Initially, the at least one processor 210 may apply Otsu's thresholding operation on an input borderless image (Tab) of FIG. 6(*a*). The thresholding may produce an image $Tab_{otsu}$ where 0s denote foreground pixels, and is denote background pixels.

To handle the first challenge (i.e., for locating horizontal and vertical white patches in the borderless table (Tab)), the at least one processor 210 may use parameterized horizontal and vertical kernels. For instance, to identify vertical white patches in the table image ($Tab_{otsu}$), a vertical slider kernel Kg may be defined as follows:

$$K_{vr}^{SL} = \begin{bmatrix} 1 & \cdots & 1 \\ \vdots & \ddots & \vdots \\ 1 & \cdots & 1 \end{bmatrix}_{Tab_h x Sl_w} \quad (8)$$

where, $Tab_h$ denotes the height of table and $Sl_w$ (slider width) is a hyper-parameter computed based on the width and height of the image (Tab). The at least one processor 210 may then convolve the above kernel with Otsu table image $Tab_{otsu}$ as follows:

$$Tab_{ColSeparators} = K_{vr}^{SL} \otimes Tab_{otsu} \quad (9)$$

where, $\otimes$ represents convolution operation. In general, convolution is the process of transforming an image by applying a kernel over each pixel and its local neighbors across the entire image. The application of convolution operation on the table image $Tab_{otsu}$ results into a vertically convolved image $Tab_{ColSeparators}$ having only column separators as shown in FIG. 6(*b*).

Similarly, to identify horizontal white patches in the table image ($Tab_{otsu}$) a horizontal slider kernel $K_{hr}^{SL}$ may be defined as follows:

$$K_{hr}^{SL} = [1\ 1\ 1\ 1\ \ldots\ 1]_{1 \times Tabs_w} \quad (10)$$

where, $Tab_w$ denoted the width of the table. The at least one processor 210 may then convolve the above kernel of equation (10) with Otsu table image $Tab_{otsu}$ as follows:

$$Tab_{RowSeparators} = K_{hr}^{SL} \otimes Tab_{otsu} \quad (11)$$

The application of convolution operation on the table image $Tab_{otsu}$ results into a horizontally convolved image $Tab_{RowSeparators}$ having only row separators as shown in FIG. 6(*c*).

The at least one processor may then draw column separators (i.e., vertical lines) at the middle of white patches in the vertically convolved image $Tab_{ColSeparators}$, as shown in FIG. 6(*d*). The at least one processor may further draw row separators (i.e., horizontal lines) at the middle of white patches in the horizontally convolved image $Tab_{RowSeparators}$, as shown in FIG. 6(*e*). Drawing row and column separators comprises filling the middle of white patches with the foreground color of original table image (Tab)).

To solve the second challenge (i.e., handling rows which span over multiple lines of text), it is necessary to refine the row separators in equation (10). To refine the row separators, the at least one processor 210 may use the information about the number of filled cells in a given row. For any row in the table image of FIG. 6(*e*), if the number of filled cells is less than a threshold $Th_{cellsfilled}$, the at least one processor may remove the row separator corresponding to that row (i.e., row separator above that row) resulting in an image $Tab_{lines}$ with horizontal and vertical lines, as shown in FIG. 6(*f*). In one non-limiting embodiment, the value of the threshold $T_{cellsfilled}$ is equal to one added with half of the number of columns in the table.

$$Th_{cellsfilled} = \tfrac{1}{2}(T_c) + 1 \quad (12)$$

where, $T_c$ is the total number of columns in the table. Consider an example of FIG. 6(*e*), where total number of columns i.e., $T_c=3$. Now, as per equation (12), threshold $Th_{cellsfilled}$ is 2 (after applying floor operation). For rows 1 to 3, the number of filled cells is 3, 3, 2 respectively, which is either more than or equal to the threshold $Th_{cellsfilled}$ (which is 2). However, for rows 4 to 17, the number of filled cells is 1, which is less than the threshold $Th_{cellsfilled}$ Hence, at least one processor may remove the row separator above the rows 4 to 17, resulting in the image ($Tab_{lines}$) as shown in Figure (f) which is a bordered image corresponding to the original borderless image (Tab). Now, the at least one processor 210 can easily detect the cell regions by identifying contours from the table image $Tab_{lines}$ of FIG. 6(*f*).

In one non-limiting embodiment, the at least one processor 210 may use visual clues such as alternate color of rows (e.g., in case of colored tables, as detected in stage 330) for identifying the row and column separators. The final output of stage 340 (i.e., list of co-ordinates for detected cells within the table) is provided as input to next processing stage of table cell content extraction 350.

Table Cell Content Extraction (350):

In one non-limiting embodiment, the at least one processor 210 may utilize an OCR tool for extracting content from the detected cells. It may be noted that instead of making individual OCR calls for every cell in the table, the at least one processor 210 makes a single OCR call for one page of the document. This approach reduces the number of OCR calls made thereby, increasing the throughput of the system. The output from the system 100 may be different tables present in the input document along with their content.

In one non-limiting embodiment, the final output from the system 100 at the end of stage 350 may be a file 130 containing detailed information regarding the input document 120 including page numbers, number of tables per page, confidence scores, raw table texts, type of table, co-ordinates of bounding boxes, table cell co-ordinates, individual cell contents etc. The output file 130 may be saved in the memory of the computing device 110 or may be shared with an external entity for further processing/use. The at least one processor 210 may generate different types of output files depending on requirement e.g., excel file, JSON file, CSV file, but not limited thereto.

It may be noted that the parameters $K_w$ (kernel width), $K_h$ (kernel height), $Th_{color}$ (for colored table), and $Sl_w$ (slider width) are hyperparameters which are fine tined for optimizing the performance of various tasks. In one non-limiting embodiment, the proposed system 100 may determine whether tables spanning over multiple pages belong to same table or are separate tables based on information of table headers, number of cells, table co-ordinates. For example, if there is a table at the end of one page and there is another table at the beginning of a next page. Then, the at least one processor 210 may determine whether these two tables are a single table using information of number of columns and headers of the two tables.

The present disclosure discloses a generic end-to-end system for extracting content present in tabular structures in medical documents. The proposed generalized system can easily extract the tabular content from a wide range of unstructured/structured medical documents with high accuracy while preserving the original format of tables/documents. The proposed system is able to precisely capture all tables present in the medical documents and performs well on the pages containing multiple table i.e., the proposed system provides a high precision and high recall which is important in medical document processing. Further, the proposed system eliminates post processing done by the end user i.e., it eliminates the need of manually verifying the extracted content.

Since the kernel sizes vary according to the size of the table, the proposed system ensures that the varied layouts of tables present in the medical documents are captured with perfection. The table cell detection stage of the proposed system has better performance as it is able to handle even the cells where the content spans over multiple rows. The proposed system is able to quickly extract the tabular content while using minimum resources (i.e., less memory requirement, less CPU utilization etc.). Using the proposed system, a plurality of documents can be processed in shorter amount of time.

The techniques of the present disclosure do not require human powered high quality annotation of training data as required by deep learning based techniques, thereby eliminating manual efforts of data annotation and also saving time and computing resources. The proposed system can be integrated with other systems easily.

In the present disclosure only one computing device 110 has been shown in the system 100. However, the present disclosure is not limited thereto and in general the system 100 may comprise a number of computing devices (or client computing devices) which may be in communication with the computing device 110 (or server) via at least one network. A user may upload one or more documents 120 on the client devices and the client devices may send the uploaded documents to the server 110 which may extract content from the received documents and may generate one or more output files 130 corresponding to the inputs documents 120. In one embodiment, the client devices may be located at customer premises and the server 110 may be remotely located. In another embodiment, both the client and server may be located at the customer premises because of the PHI information present in the medical documents.

In one non-limiting embodiment of the present disclosure, the proposed techniques may be extended to an automated platform for extracting tabular data which may be beneficial for health care facilities, outside entities, and researchers. The platform may be provided in the form application programming interface (API) or deployable web-based solutions. The entity willing to extract tabular data from a document may upload the document and the platform may provide extracted tabular data to the entity. This saves additional computational costs and enhances end user experience. The techniques of the present disclosure may utilize a Graphical User Interface (GUI) provided on the computing devices so as to enable a convenient and easy processing of medical records (even for non-experts).

Figure 7:
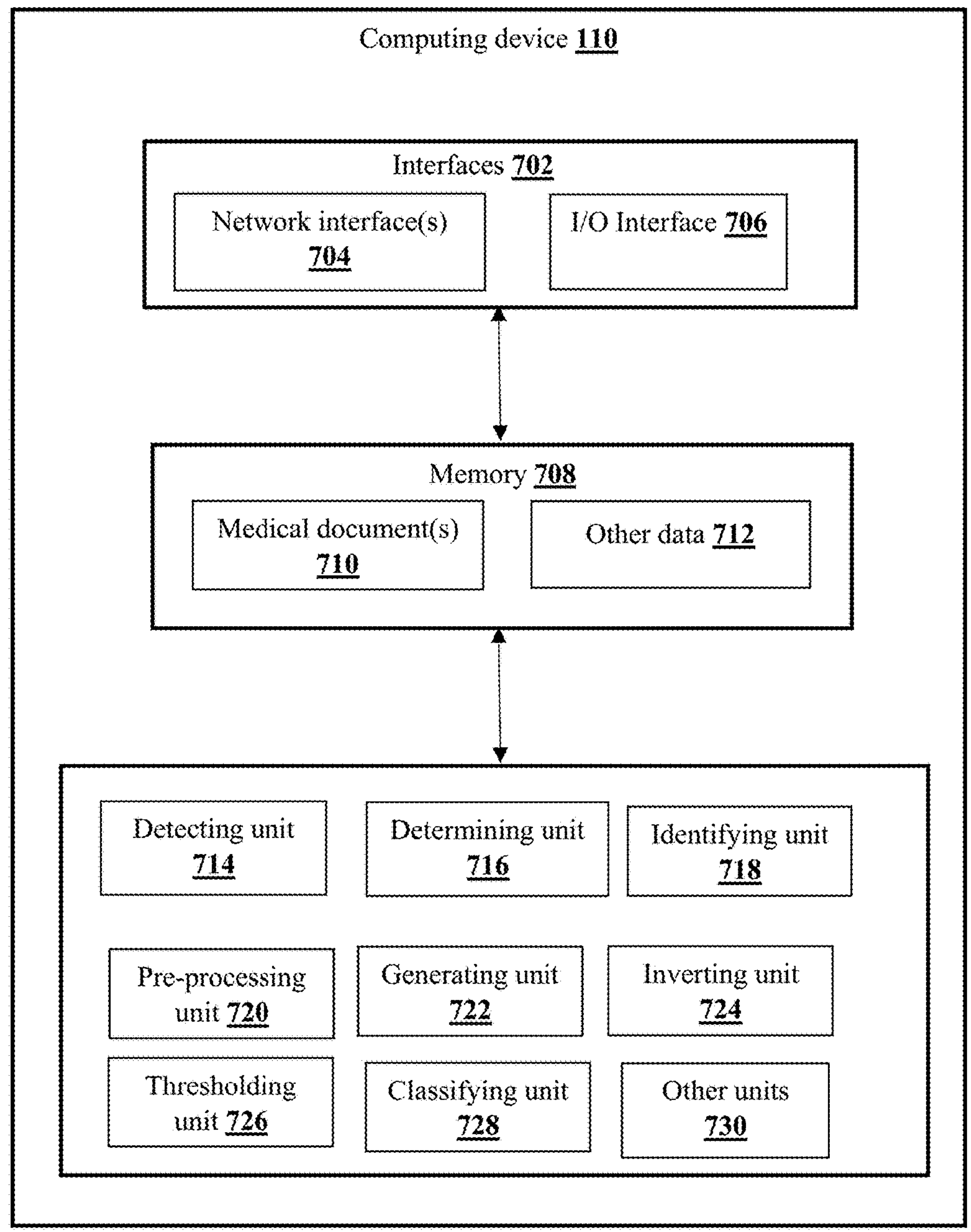
FIG. 7 shows a block diagram 700 of a computing device 110, in accordance with an embodiment of the present disclosure.

Referring now to FIG. 7, which shows a block diagram of a computing device 110, in accordance with some embodiments of the present disclosure. In one non-limiting embodiment of the present disclosure, the computing device 110 may comprise various other hardware components such as various interfaces 702, memory 708, and various units or means as shown in FIG. 7. The units may comprise a detecting unit 714, a determining unit 716, an identifying unit 718, a pre-processing unit 720, a generating unit 722, an inverting unit 724, a thresholding unit 726, a classifying unit 728, and various other units 730. The other units 730 may comprise a display unit, a storing unit, a training unit, a transmitting unit, a receiving unit, a counting unit etc. In an embodiment, the units 714-730 may be dedicated hardware units capable of executing one or more instructions stored in the memory 708 for performing various operations of the computing device 110. In another embodiment, the units 714-730 may be software modules stored in the memory 708 which may be executed by the at least one processor 210 for performing the operations of the computing device 110.

The interfaces 702 may include a variety of software and hardware interfaces, for example, a web interface, a graphical user interface, an input device-output device (I/O) interface 706, a network interface 704 and the like. The I/O interfaces 706 may allow the computing device 110 to interact with other computing devices directly or through other devices. The network interface 704 may allow the computing device 110 to interact with one or more external devices either directly or via a network.

The memory 708 may comprise one or more medical documents 710, and other various types of data 712 such as one or more instructions executable by the at least processor 210. The memory 708 may be any of the memories 220.

Figure 8:
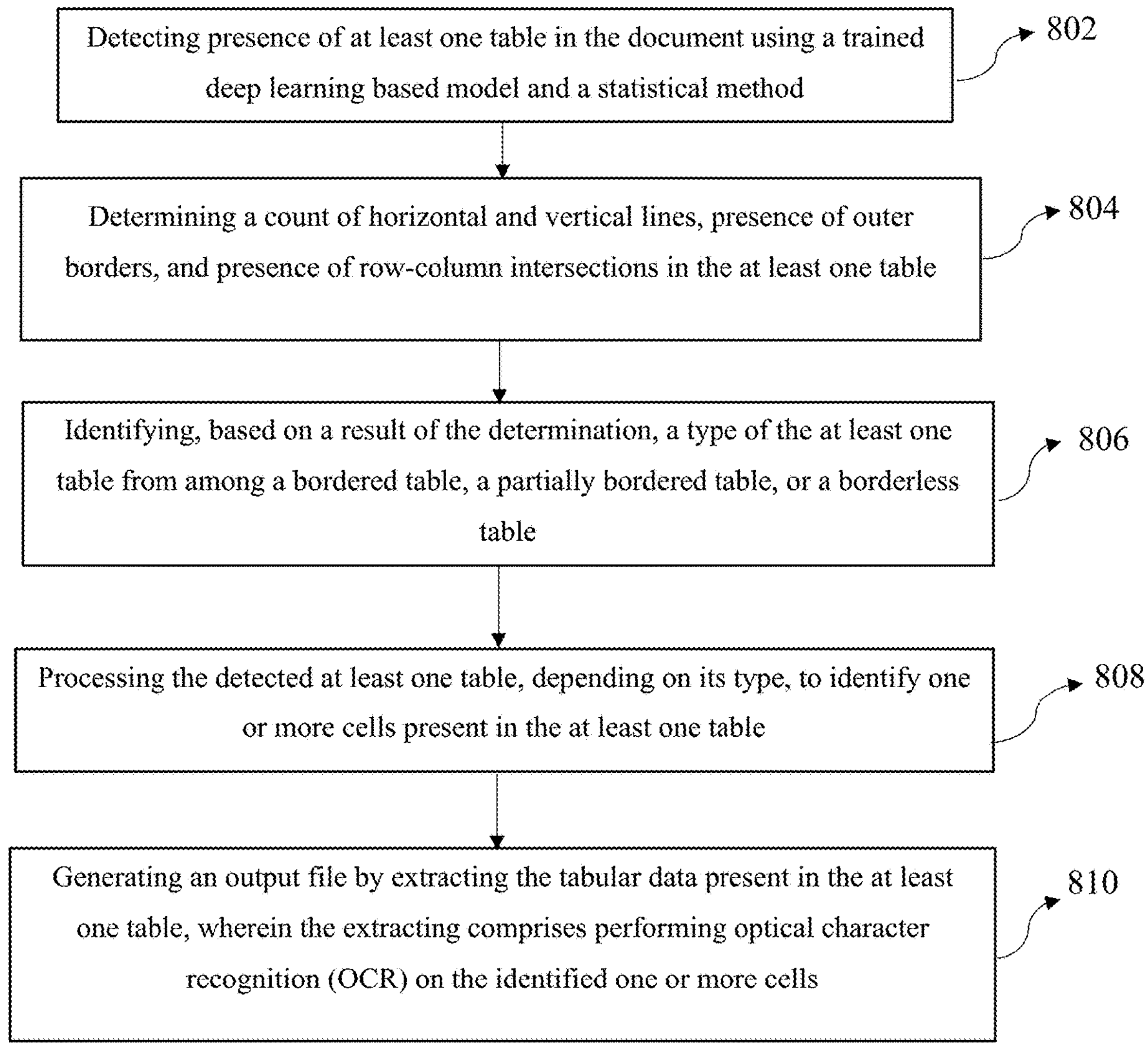
FIG. 8 depicts a flowchart illustrating a method 800 for extracting tabular data present in a document, in accordance with some embodiments of the present disclosure.

Referring now to FIG. 8, a flowchart is described illustrating an exemplary method 800 for extracting tabular data present in a document, according to an embodiment of the present disclosure. The method 800 is merely provided for exemplary purposes, and embodiments are intended to include or otherwise cover any methods or procedures for anonymizing medical records. The operations of method 800 may be performed by the at least one processor 210 of FIG. 2 or by various unit of FIG. 7.

The method 800 may include, at block 802, detecting presence of at least one table in the document using a trained deep learning based model and a statistical method. The at least one table may be an image comprising a table. The deep learning based model may be adapted to provide multiple overlapping table predictions along with their confidence scores for the detected at least one table. The statistical method may be adapted to select a single table prediction from the multiple overlapping table predictions based on the confidence scores. In one non-limiting embodiment, the statistical method may be Non Maximal Suppression (NMS) which may select a single table prediction by applying intersection over union on the confidence scores.

At block 804, the method 800 may include determining a count of horizontal and vertical lines, presence of outer borders, and presence of row-column intersections in the at least one table. At block 806, the method 800 may include identifying, based on a result of the determination, a type of the at least one table from among a bordered table, a partially bordered table, or a borderless table.

In one non-limiting embodiment of the present disclosure, the operation of block 802 i.e., detecting the at least one table may comprise determining co-ordinates of the at least one table present in the document and determining the presence of outer borders may comprise determining the presence of outer borders of the at least one table based on the determined table co-ordinates.

In one non-limiting embodiment, the method may further comprise inverting the at least one table image by identifying foreground and background pixels and processing the at least one inverted table image using a dynamic parametrized horizontal image kernel to generate at least one table image with only horizontal lines ($Tab_{hr}$). The method may further comprise processing the at least one inverted table image using a dynamic parametrized vertical image kernel to generate at least one table image with only vertical lines ($Tab_{vr}$) and generating at least one table image with both horizontal and vertical lines ($Tab_{lines}$) based on the generated table images ($Tab_{hr}$, $Tab_{vr}$). The method may further comprise counting the number of horizontal and vertical lines in the generated table images ($Tab_{hr}$r, $Tab_{vr}$) and processing the generated at least one table image ($Tab_{lines}$) using an image kernel of fixed size to detect presence of the row-column intersections in the generated at least one table image ($Tab_{lines}$).

In one non-limiting embodiment, the operations of block 806 i.e., identifying a type of the at least one table may comprise identifying the at least one table as a borderless table when the count of horizontal and vertical lines is zero and the outer borders are absent; identifying the at least one table as a bordered table when the row-column intersections and the outer borders are present; and identifying the at least one table as a partial bordered table: when a count of row-column intersections is non-zero and the outer borders are absent; or when a count of row-column intersections is zero and the outer borders are present.

At block 808, the method 800 may include processing the detected at least one table, depending on its type, to identify one or more cells present in the at least one table.

In one non-limiting embodiment of the present disclosure, the operation of block 808 i.e., processing the detected at least one table to identify one or more cells may comprises converting the detected at least one table into a bordered table, when the detected at least one table is a borderless table; converting the detected at least one table into a borderless table and then into a bordered table, when the detected at least one table is a partially bordered table; and identifying co-ordinates of the one or more cells present in the bordered table to extract the tabular data.

In one non-limiting embodiment of the present disclosure, converting the partial bordered table into a borderless table may comprise processing the partial bordered table using dynamic parametrized horizontal and vertical image kernels to generate a table with horizontal and vertical lines ($Tab_{lines}$); and removing the horizontal and vertical lines from the table with horizontal and vertical lines ($Tab_{lines}$) to obtain the borderless table.

In one non-limiting embodiment of the present disclosure, converting the borderless table into a bordered table may comprise processing the borderless table image using a dynamic parametrized horizontal image kernel to generate a table image comprising row separators; processing the borderless table image using a dynamic parametrized vertical image kernel to generate a table image comprising column separators. The converting the borderless table into a bordered table may further comprise generating a bordered table comprising horizontal and vertical lines based on the table images comprising row and column separators; and removing the horizontal line corresponding to a table row of the bordered table image, when a number of filled cells in the table row is less than a threshold number.

At block 810, the method 800 may include generating an output file by extracting the tabular data present in the at least one table, where the extracting may comprise performing optical character recognition (OCR) on the identified one or more cells.

In one non-limiting embodiment, the method may further comprise classifying the detected at least one table into a colored table or a non-colored table based on a difference of foreground and background pixels.

The disclosed techniques of extracting tabular data are time efficient and consume less computing resources compared to the conventional techniques. The disclosed techniques have a higher accuracy compared to other techniques of extracting tabular data.

The above method 800 may be described in the general context of computer executable instructions. Generally, computer executable instructions can include routines, programs, objects, components, data structures, procedures, modules, and functions, which perform specific functions or implement specific abstract data types.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module(s), including, but not limited to the processor 210 of FIG. 2 and the various units of FIG. 7. Generally, where there are operations illustrated in Figures, those operations may have corresponding counterpart means-plus-function components.

It may be noted here that the subject matter of some or all embodiments described with reference to FIGS. 1-7 may be relevant for the method and the same is not repeated for the sake of brevity.

For the sake of simplicity the present disclosure has been described for detecting and extracting content present in one table of a document. However, the present disclosure is not limited thereto and the system of the present disclosure can easily detect and extract content from multiple tables present in the same document.

The techniques of the present disclosure have been described by considering the input document as a medical document. However, the present disclosure is not limited thereto and in general the techniques of the present disclosure can be easily extended for extracting content from various different types of documents which may have tabular data therein including, but not limited to, income sheets, balance sheets, invoices, bank statements and ledgers, newspapers, research papers, survey papers, white papers, resumes, scanned documents etc.

In a non-limiting embodiment of the present disclosure, one or more non-transitory computer-readable media may be utilized for implementing the embodiments consistent with the present disclosure. Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The terms “including”, “comprising”, “having” and variations thereof mean “including but not limited to”, unless expressly specified otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

What is claimed is:

1. A computer implemented method for extracting tabular data present in a document, the method comprising:
- detecting presence of at least one table in the document using a trained deep learning based model and a statistical method, wherein for each of the at least one table:
  - the deep learning based model is adapted to provide a plurality of overlapping table predictions and a plurality of confidence scores corresponding to the plurality of overlapping table predictions, and
  - the statistical method is adapted to select a single table prediction from the plurality of overlapping table predictions by applying intersection over union on the plurality of confidence scores;
- determining a count of horizontal and vertical lines, presence of outer borders, and presence of row-column intersections in the at least one table;
- identifying, based on a result of the determination, a type of the at least one table from among a bordered table, a partially bordered table, or a borderless table;
- processing the detected at least one table, depending on its type, to identify one or more cells present in the at least one table; and
- generating an output file by extracting the tabular data present in the at least one table, wherein the extracting comprises performing optical character recognition (OCR) on the identified one or more cells.

2. The method of claim 1, wherein each of the at least one table is an image comprising a table.

3. The method of claim 1,
- wherein the statistical method is a Non Maximal Suppression (NMS) statistical method.

4. The method of claim 1, wherein detecting the at least one table comprises determining co-ordinates of the at least one table present in the document, and wherein determining the presence of outer borders comprises:
- determining the presence of outer borders of the at least one table based on the determined table co-ordinates.

5. The method of claim 2, wherein determining the count of horizontal and vertical lines and the presence of row-column intersections comprises:
- inverting the at least one table image by identifying foreground and background pixels;
- processing the at least one inverted table image using a dynamic parametrized horizontal image kernel to generate at least one table image with only horizontal lines ($Tab_{hr}$);
- processing the at least one inverted table image using a dynamic parametrized vertical image kernel to generate at least one table image with only vertical lines ($Tab_{vr}$);
- generating at least one table image with both horizontal and vertical lines ($Tab_{lines}$) based on the generated table images ($Tab_{hr}$, $Tab_{vr}$);
- counting the number of horizontal and vertical lines in the generated table images ($Tab_{hr}$, $Tab_{vr}$); and
- processing the generated at least one table image ($Tab_{lines}$) using an image kernel of fixed size to detect presence of the row-column intersections in the generated at least one table image ($Tab_{lines}$).

6. The method of claim 1, wherein identifying the type of the at least one table comprises:
- identifying the at least one table as the borderless table when the count of horizontal and vertical lines is zero and the outer borders are absent;
- identifying the at least one table as the bordered table when the row-column intersections and the outer borders are present; and
- identifying the at least one table as the partially bordered table:
  - when a count of the row-column intersections is non-zero and the outer borders are absent; or
  - when a count of the row-column intersections is zero and the outer borders are present.

7. The method of claim 2, further comprising:
- classifying the detected at least one table into a colored table or a non-colored table based on a difference of foreground and background pixels.

8. The method of claim 2, wherein processing the detected at least one table to identify one or more cells comprises:
- converting the detected at least one table into the bordered table, when the detected at least one table is the borderless table;
- converting the detected at least one table into the borderless table and then into the bordered table, when the detected at least one table is the partially bordered table; and
- identifying co-ordinates of the one or more cells present in the bordered table to extract the tabular data.

9. The method of claim 8, wherein converting the partially bordered table into the borderless table comprises:
- processing the partially bordered table using dynamic parametrized horizontal and vertical image kernels to generate a table with horizontal and vertical lines ($Tab_{lines}$); and
- removing the horizontal and vertical lines from the table with horizontal and vertical lines ($Tab_{lines}$) to obtain the borderless table.

10. The method of claim 8, wherein converting the borderless table into the bordered table comprises:
- processing the borderless table using a dynamic parametrized horizontal image kernel to generate a table image comprising row separators;
- processing the borderless table using a dynamic parametrized vertical image kernel to generate the table image comprising column separators;
- generating the bordered table comprising horizontal and vertical lines based on the table images comprising the row and column separators; and removing the horizontal lines corresponding to a table row of the bordered table, when a number of filled cells in the table row is less than a threshold number.

11. An end-to-end system for extracting tabular data present in a document, the system comprising:

a memory storing computer executable instructions; and at least one processor in electronic communication with the memory and configured to:

detect presence of at least one table in the document using a trained deep learning based model and a statistical method, wherein for each of the at least one table:

the deep learning based model is adapted to provide a plurality of overlapping table predictions and a plurality of confidence scores corresponding to the plurality of overlapping table predictions, and the statistical method is adapted to select a single table prediction from the plurality of overlapping table predictions by applying intersection over union on the plurality of confidence scores;

determine a count of horizontal and vertical lines, presence of outer borders, and presence of row-column intersections in the at least one table;

identify, based on a result of the determination, a type of the at least one table from among a bordered table, a partially bordered table, or a borderless table;

process the detected at least one table, depending on its type, to identify one or more cells present in the at least one table; and generate an output file by extracting the tabular data present in the at least one table, wherein the extracting comprises performing optical character recognition (OCR) on the identified one or more cells.

12. The system of claim 11, wherein each of the at least one table is an image comprising a table.

13. The system of claim 11, wherein the statistical method is a Non Maximal Suppression (NMS) statistical method.

14. The system of claim 11, wherein to detect the at least one table, the at least one processor is configured to determine co-ordinates of the at least one table present in the document, and wherein to determine the presence of outer borders, the at least one processor is configured to:

determine the presence of outer borders of the at least one table based on the determined table co-ordinates.

15. The system of claim 12, wherein to determine the count of horizontal and vertical lines and the presence of row-column intersections, the at least one processor is configured to:

invert the at least one table image by identifying foreground and background pixels;

process the at least one inverted table image using a dynamic parametrized horizontal image kernel to generate at least one table image with only horizontal lines ($Tab_{hr}$);

process the at least one inverted table image using a dynamic parametrized vertical image kernel to generate at least one table image with only vertical lines ($Tab_{vr}$);

generate at least one table image with both horizontal and vertical lines ($Tab_{lines}$) based on the generated table images ($Tab_{hr}$, $Tab_{vr}$);

count the number of horizontal and vertical lines in the generated table images ($Tab_{hr}$, $Tab_{vr}$); and process the generated at least one table image ($Tab_{lines}$) using an image kernel of fixed size to detect presence of the row-column intersections in the generated at least one table image ($Tab_{lines}$).

16. The system of claim 11, to identify the type of the at least one table, the at least one processor is configured to:

identify the at least one table as the borderless table when the count of horizontal and vertical lines is zero and the outer borders are absent;

identify the at least one table as the bordered table when the row-column intersections and the outer borders are present; and identify the at least one table as the partially bordered table:

when a count of the row-column intersections is non-zero and the outer borders are absent; or when a count of the row-column intersections is zero and the outer borders are present.

17. The system of claim 12, wherein to process the detected at least one table to identify one or more cells, the at least one processor is configured to:

convert the detected at least one table into the bordered table, when the detected at least one table is the borderless table;

convert the detected at least one table into the borderless table and then into the bordered table, when the detected at least one table is the partially bordered table; and identify co-ordinates of the one or more cells present in the bordered table to extract the tabular data.

18. The system of claim 17, wherein to convert the partially bordered table into the borderless table, the at least one processor is configured to:

process the partially bordered table using dynamic parametrized horizontal and vertical image kernels to generate a table with horizontal and vertical lines ($Tab_{lines}$); and remove the horizontal and vertical lines from the table with horizontal and vertical lines ($Tab_{lines}$) to obtain the borderless table.

19. The system of claim 17, wherein to convert the borderless table into the bordered table, the at least one processor is configured to:

process the borderless table using a dynamic parametrized horizontal image kernel to generate a table image comprising row separators;

process the borderless table using a dynamic parametrized vertical image kernel to generate the table image comprising column separators;

generate the bordered table comprising horizontal and vertical lines based on the table images comprising the row and column separators; and remove the horizontal lines corresponding to a table row of the bordered table, when a number of filled cells in the table row is less than a threshold number.

20. A non-transitory computer readable media storing one or more instructions executable by at least one processor for extracting tabular data present in a document, the one or more instructions comprising:

one or more instructions for detecting presence of at least one table in the document using a trained deep learning based model and a statistical method, wherein for each of the at least one table:

the deep learning based model is adapted to provide a plurality of overlapping table predictions and a plurality of confidence scores corresponding to the plurality of overlapping table predictions, and the statistical method is adapted to select a single table prediction from the plurality of overlapping table predictions by applying intersection over union on the plurality of confidence scores;

one or more instructions for determining a count of horizontal and vertical lines, presence of outer borders, and presence of row-column intersections in the at least one table;

one or more instructions for identifying, based on a result of the determination, a type of the at least one table from among a bordered table, a partially bordered table, or a borderless table;

one or more instructions for processing the detected at least one table, depending on its type, to identify one or more cells present in the at least one table; and one or more instructions for generating an output file by extracting the tabular data present in the at least one table, wherein the extracting comprises performing optical character recognition (OCR) on the identified one or more cells.

* * * * *